United States Patent
Peter et al.

(10) Patent No.: US 11,425,673 B2
(45) Date of Patent: Aug. 23, 2022

(54) TIME SYNCHRONIZATION FOR SENSOR DATA RECORDING DEVICES

(71) Applicant: Lytx, Inc., San Diego, CA (US)

(72) Inventors: Brendan Peter, San Diego, CA (US); Larry Richardson, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 49 days.

(21) Appl. No.: 17/025,807

(22) Filed: Sep. 18, 2020

(65) Prior Publication Data

US 2021/0007071 A1 Jan. 7, 2021

Related U.S. Application Data

(63) Continuation of application No. 16/002,737, filed on Jun. 7, 2018, now Pat. No. 10,820,292.

(51) Int. Cl.
*H04L 67/12* (2022.01)
*H04L 9/40* (2022.01)
*H04Q 9/00* (2006.01)
*H04W 56/00* (2009.01)
*H04L 7/00* (2006.01)
*H04W 60/06* (2009.01)

(52) U.S. Cl.
CPC ......... *H04W 56/004* (2013.01); *H04L 7/0054* (2013.01); *H04W 60/06* (2013.01); *H04L 63/101* (2013.01); *H04L 67/12* (2013.01); *H04Q 9/00* (2013.01); *H04Q 2209/10* (2013.01)

(58) Field of Classification Search
CPC ............ G06K 9/00711; H04W 56/004; H04W 60/06; H04L 7/0054; H04Q 2209/10; G06T 7/20
See application file for complete search history.

(56) References Cited

U.S. PATENT DOCUMENTS

| | | | |
|---|---|---|---|
| 10,089,059 B1* | 10/2018 | Taneja | G06F 3/04817 |
| 2003/0076842 A1 | 4/2003 | Johansson | |
| 2007/0055766 A1 | 3/2007 | Petropoulakis | |
| 2008/0252445 A1 | 10/2008 | Kolen | |
| 2008/0307075 A1* | 12/2008 | Urano | G06F 1/14 |
| | | | 709/220 |
| 2014/0354446 A1 | 12/2014 | Nakayama | |
| 2015/0127284 A1 | 5/2015 | Seshan | |
| 2015/0260030 A1 | 9/2015 | Wisinger, Jr. | |
| 2015/0312350 A1 | 10/2015 | Kauppila | |
| 2016/0127118 A1* | 5/2016 | Yun | H04L 7/0016 |
| | | | 375/357 |
| 2016/0226928 A1 | 8/2016 | Park | |
| 2017/0041897 A1 | 2/2017 | Pitigoi-Aron | |

* cited by examiner

*Primary Examiner* — Iqbal Zaidi
(74) *Attorney, Agent, or Firm* — Van Pelt, Yi & James LLP

(57) ABSTRACT

A leader system for time synchronizing includes an interface and a processor. The interface is configured to receive a time standard. The processor is configured to determine whether a time jump is necessary in response to the time standard; and in response to determining that the time jump is necessary: 1) cause overwriting a sensor data buffer; 2) provide an indication to unregister one or more follower devices from a leader device; and 3) time jump a leader device time in response to the time standard.

17 Claims, 15 Drawing Sheets

500

| Message Header | |
|---|---|
| Content | Size in bytes |
| Message signature "DCWF" | 4 |
| Length of all following fields | 16 |
| Protocol version | 1 |
| Type of device sending this packet | 1 |
| Serial number of device sending this packet | 20 |
| Timestamp of when message is created | 8 |
| Message ID | 1 |
| Payload (optional) | 0-64 |

| Registration Message Payload | |
|---|---|
| Content | Size in bytes |
| Firmware major version number | 4 |
| Firmware minor version number | 4 |
| Firmware build number | 4 |
| Device settings hash | 33 |

| Acknowledgement Message Payload | |
|---|---|
| Content | Size in bytes |
| Timestamp of acknowledged message | 8 |

FIG. 5C

TIME SYNCHRONIZATION FOR SENSOR DATA RECORDING DEVICES

CROSS REFERENCE TO OTHER APPLICATIONS

This application is a continuation of U.S. patent application Ser. No. 16/002,737, entitled TIME SYNCHRONIZATION FOR SENSOR DATA RECORDING DEVICES filed Jun. 7, 2018 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors—for example, video recorders, audio recorders, accelerometers, gyroscopes, vehicle state sensors, GPS (global positioning system), etc., that report data, which is used to determine the occurrence of an anomalous event. Sensor data is reviewed to determine anomalous events by the vehicle event recorder or by an external reviewing system. Anomalous event types include accident anomalous events, maneuver anomalous events, location anomalous events, proximity anomalous events, vehicle malfunction anomalous events, driver behavior anomalous events, or any other anomalous event types. In some cases, the vehicle event recorder includes multiple units mounted in different locations in a vehicle, each unit having its own set of sensors, processors, and data collection and storage systems. Alternatively, multiple vehicle event recorders can be included in a vehicle, each recorder providing its own time-stamped sensor data to a vehicle data server for further processing. In these cases, one challenge that arises is to time synchronize the sensor data collected from multiple vehicle event recorders or other units for a particular anomalous event in order to ensure an accurate depiction of the particular event.

BRIEF DESCRIPTION OF THE DRAWINGS

Various embodiments of the invention are disclosed in the following detailed description and the accompanying drawings.

FIGS. 5A-5C depict embodiments of message packet formats for messages exchanged between a leader device and a follower device over a network.

DETAILED DESCRIPTION

Figure 1:
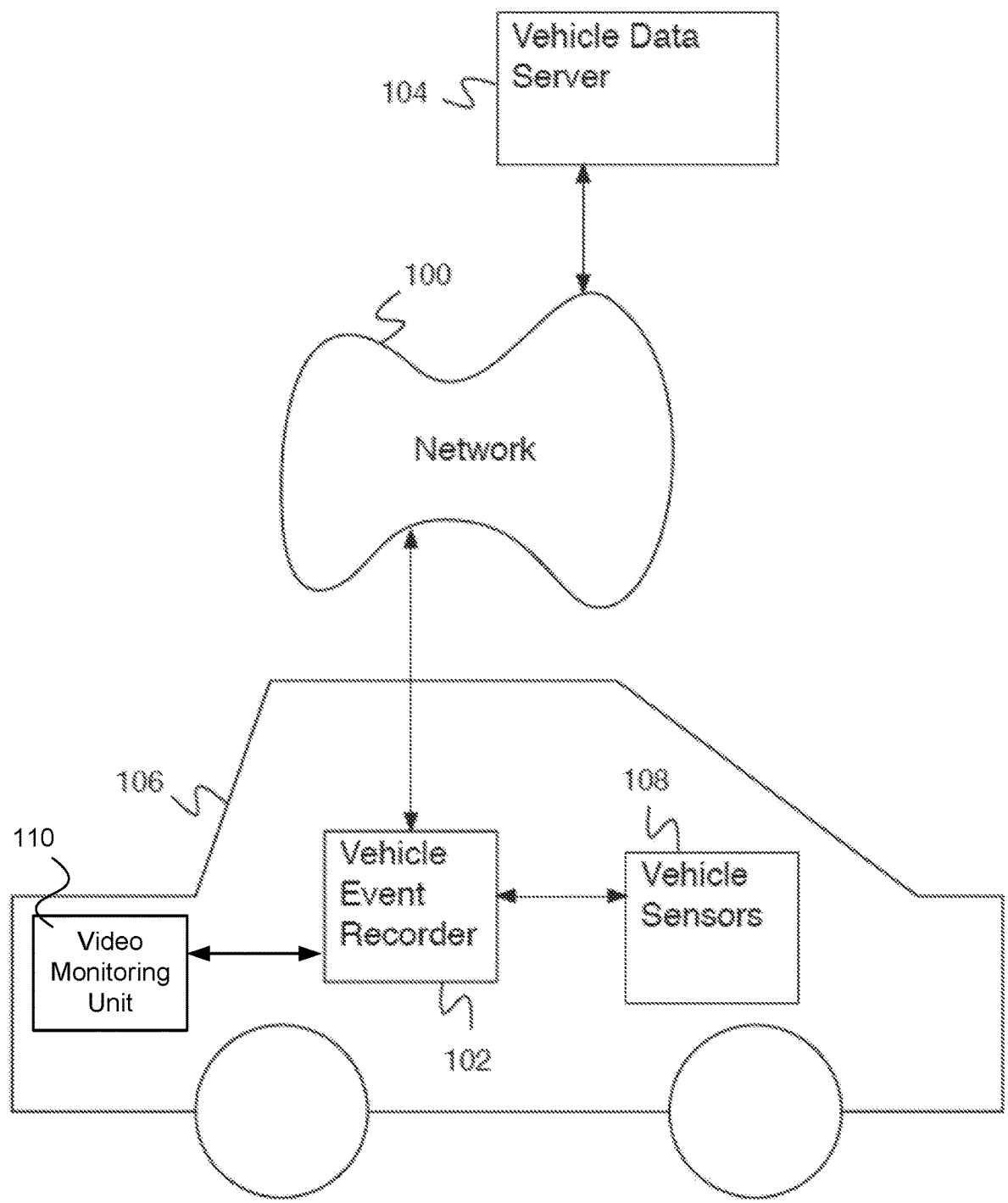
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A leader system for time synchronizing comprises an interface configured to receive a time standard and a processor configured to determine whether a time jump is necessary in response to the time standard, wherein in response to determining that the time jump is necessary, the processor is further configured to cause pausing of a collection of sensor data, provide an indication to unregister one or more follower devices from a leader device, and time jump a leader device time in response to the time standard.

In some embodiments, a leader system for time synchronizing sensor data recording devices comprises an interface configured to receive a time standard and a processor configured to determine whether a time jump is necessary in response to the time standard, wherein in response to determining that the time jump is necessary, the processor is further configured to cause pausing of a collection of sensor data, cause overwriting a sensor data buffer, provide an indication to unregister one or more follower devices from a leader device, time jump a leader device time in response to the time standard, cause restarting the collection of sensor data, receive a registration request from the one or more follower devices, and send a registration acknowledgement message in response to the registration request. In some examples, the indication to unregister one or more follower devices from the leader device comprises closing a network socket to which the one or more follower devices are connected. In some cases, in response to determining that a follower device from which the registration request is received is on a white list, the processor is configured to send a registration acknowledgement message to the follower device determined to be on the white list. In various embodiments, the registration acknowledgement message includes a current leader device time obtained in response to the time jump.

A follower system for time synchronizing comprises an interface configured to receive an indication for registering or unregistering from a leader device and a processor configured to receive a time message from the leader device, determine whether a time jump is necessary in response to the time message, and in response to determining that the time jump is necessary, cause pausing of a collection of sensor data, and time jump a follower device time.

In some embodiments, a follower system for time synchronizing sensor data recording devices comprises an interface configured to receive an indication for registering or unregistering from a leader device and a processor configured to unregister from the leader device in response to an indication from the leader device to unregister, provide a registration message to the leader device requesting registration, receive a registration acknowledgement message sent by the leader device in response to the registration message, determine whether a time jump is necessary in response to the registration acknowledgement message, and in response to determining that the time jump is necessary, cause pausing of a collection of sensor data and time jump a follower device time.

In some embodiments, the system for time synchronizing is used to synchronize times for stored sensor data associated with a vehicle. The vehicle (e.g., a car, van, truck, truck with trailer(s), etc.) may include multiple devices that each independently collect various data streams, store these data streams, and transmit the data streams to be remotely stored and associated with other vehicle associated data. The time stamps associated with the data may not be aligned with each other (e.g., due to drift between the clocks and/or mismatched overall time settings) and unless properly synchronized will not be useful in identifying and cross associating data collected from the multiple devices. Without this time synchronizing system, it would not be possible to associate data from the different sensors to determine corresponding events with the data streams and sequencing of events from and between different devices would be suspect. The time synchronizing system improves the efficiency of determining correspondence and sequence for stored events, later processing of the stored events, and analysis of the stored events.

FIG. 1 is a block diagram illustrating an embodiment of a system including a sensor data recording device such as a vehicle event recorder. In the example shown, vehicle event recorder 102 is mounted to a vehicle 106. In various embodiments, vehicle 106 comprises a car, a truck, a commercial vehicle, or any other appropriate vehicle. Vehicle event recorder 102 is mounted on vehicle 106 in any appropriate location—for example the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components.

Vehicle event recorder 102 is in communication with external sensors (e.g., vehicle sensors 108) and internal sensors of vehicle event recorder 102 as well as other units (e.g., video monitoring unit 110). Vehicle sensors 108, other units, and internal sensors comprise one or more sensors—for example, one or more video recorders, audio recorders, accelerometers, gyroscopes, vehicle state sensors, proximity sensors, a global positioning system (e.g., GPS), outdoor temperature sensors, moisture sensors, laser line tracker sensors, etc. Vehicle state sensors comprise internal vehicle state sensors—for example, a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, a backup camera, etc. Vehicle event recorder 102 and other units store sensor data associated with events and time stamp the events. However, in order to properly associate sensor data from different units the time stamps need to correspond to each other. In particular, vehicle event recorder 102 and other units (e.g., video monitoring unit 110) should have synchronized clocks). In various embodiments, the other units comprise one or more video monitoring units, environmental sensor units (e.g., temperature, moisture, etc.), radar or lidar units, or any other appropriate units.

Vehicle event recorder 102 comprises a system for receiving and processing sensor data. Processing sensor data comprises filtering data, identifying patterns in data, detecting events, etc.

Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks—for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). In particular, vehicle event recorder 102 communicates with vehicle data server 104 via network 100.

Vehicle data server 104 comprises a vehicle data server for communicating with vehicle event recorder 102 via network 100, and for collecting events and risky behavior detected by vehicle event recorder 102. Specifically, vehicle data server 104 receives data, processes data, stores data, requests more data, provides stored data, etc. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data.

In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly.

Figure 2:
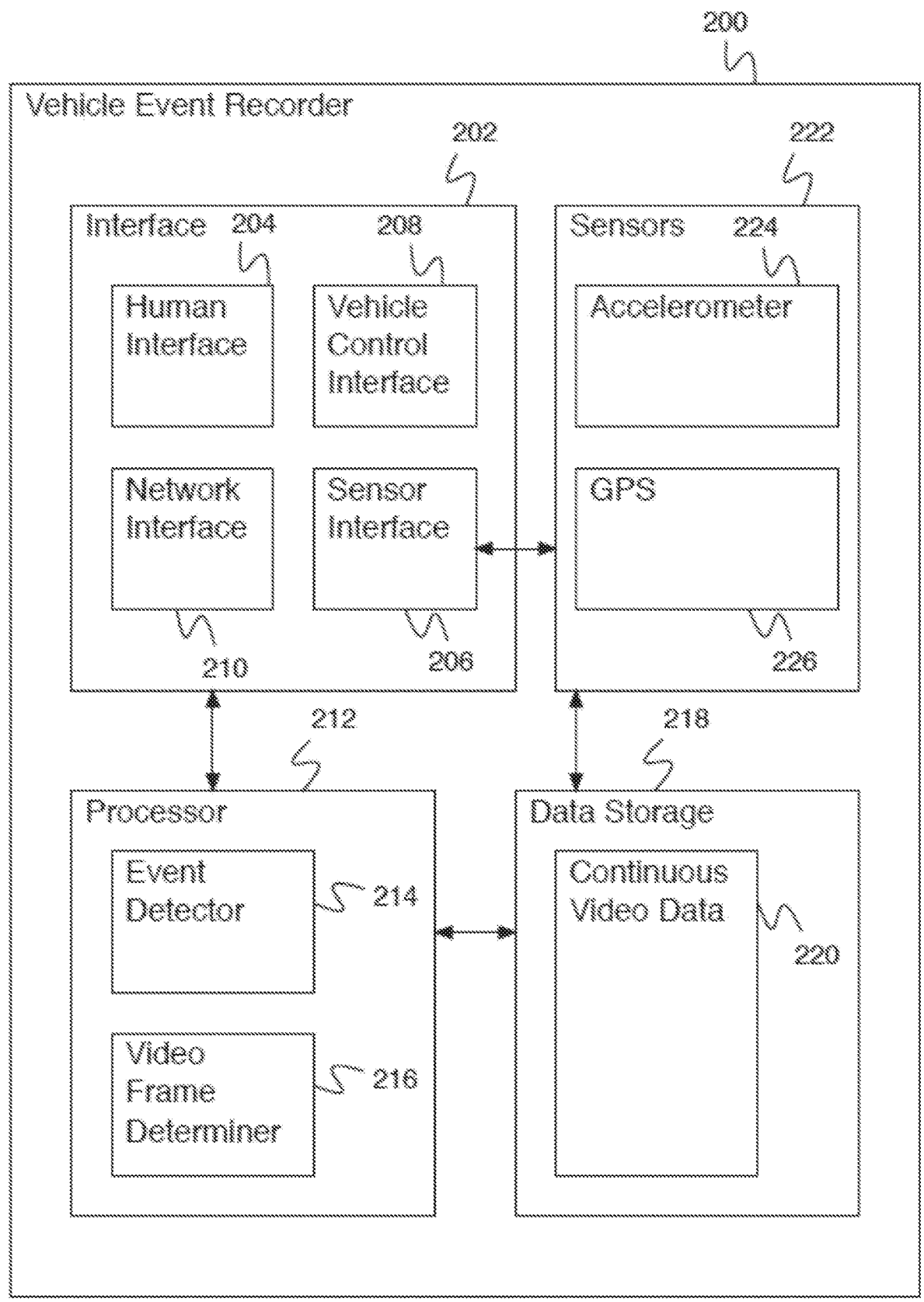
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 processes sensor data using processor 212. Processor 212 receives sensor data via sensor interface 206 of interface 202 and from internal sensors (e.g., GPS 226 or accelerometer 224 of sensors 222). In some embodiments, processor 212 determines a likely event using event detector 214 and then determines a set of video frames to send to a server using video frame determiner 216. The set of video frames is uploaded via network interface 210 to a vehicle data server. The vehicle data server makes a determination of whether more information is needed to determine an event. In response to a determination that more vehicle event recorder data is needed to determine an event, the vehicle data server provides a request to vehicle event recorder 200 for the more vehicle event recorder data. Vehicle event recorder 200 then transmits more vehicle event recorder data regarding the likely event—for example, sensor data, vehicle data, vehicle identification data, anomalous event data, driver quality data, video frame data, continuous video data, etc. to the vehicle data server.

Vehicle event recorder 200 comprises interface 202. Interface 202 comprises a set of interfaces to other systems. Human interface 204 comprises an interface to a human interaction system—for example, an audio output, a display output, etc. Sensor interface 206 comprises an interface to one or more sensors for receiving sensor data. Sensor interface 206 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, sensor interface 206 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus.

Vehicle control interface 208 comprises an interface to one or more vehicle control systems (e.g., for adjusting vehicle control parameters, for putting the vehicle in a safe mode, for adjusting an automatic driving control parameter, etc.). Network interface 210 comprises a network interface for communicating with other systems via a network (e.g., network 100 of FIG. 1). Network interface 210 comprises one or more of a GSM interface, a CDMA interface, an LTE interface, a WiFi™ interface, an Ethernet interface, a Universal Serial Bus (USB) interface, a Bluetooth™ interface, an Internet interface, etc. Processor 212 comprises a processor for controlling the operations of vehicle event recorder 200, for reading and writing information on data storage 218, for reading and/or writing data via interface 202, etc. Processor 212 comprises event detector 214 for determining events from data (e.g., video data, sensor data, etc.). Processor 212 additionally comprise video frame determiner 216 for selecting one or more video frames from continuous video data (e.g., continuous video data 220).

Data storage 218 comprises a data storage (e.g., a random access memory (RAM), a read only memory (ROM), a nonvolatile memory, a flash memory, a hard disk, or any other appropriate data storage). Data storage 218 comprises a data storage for storing instructions for processor 212, vehicle event recorder data, vehicle event data, sensor data, video data, driver scores, vehicle information, vehicle identifying information, anomalous event information, driver quality information, etc. Data storage 218 comprises continuous video data 220 comprising stored continuous video data from one or more cameras mounted on the vehicle for a previous time period (e.g., 1 minute, 5 minutes, 1 hour, 1 day, etc.).

In some embodiments, vehicle event recorder 200 comprises a system for determining events from data. In some embodiments, vehicle event recorder 200 stores data in a time-delay buffer (e.g., a buffer holding the last 30 seconds of data, the last 5 minutes of data, etc.). In some embodiments, data is deleted from the time-delay buffer after the time-delay period (e.g., a buffer holding the last 30 seconds of data deletes data as soon as it is more than 30 seconds old). In some embodiments, for example where an event is determined from data in the time-delay buffer, data associated with the event is copied from the time-delay buffer into a long-term storage. In various embodiments, event information and associated data is stored, processed, uploaded immediately, uploaded at a later time, provided to an administrator, or handled in any other appropriate way. In some embodiments, data is continually stored (e.g., and not deleted after a time-delay period). In some embodiments, for example where an event is determined from continuously stored data, an event flag is stored associated with the continuously stored data. In some embodiments, data storage is modified based at least in part on an event flag (e.g., data is stored at higher resolution in the vicinity of an event flag). In some embodiments, event data is extracted from continuously stored data. In some embodiments, event data is uploaded (e.g., immediately, at a later time, etc.). In some embodiments, flag data (e.g., an event type, an event severity, etc.) is uploaded. In some embodiments, flag metadata (e.g., a list of flags, a flag identifier, etc.) is uploaded. In some embodiments, a lookback indicator (e.g., an indicator indicating to analyze previously stored data using more sensitive thresholds) is determined from data. In some embodiments, minor events are determined from data as a result of analyzing previously stored data in response to a lookback indicator.

Figure 3:
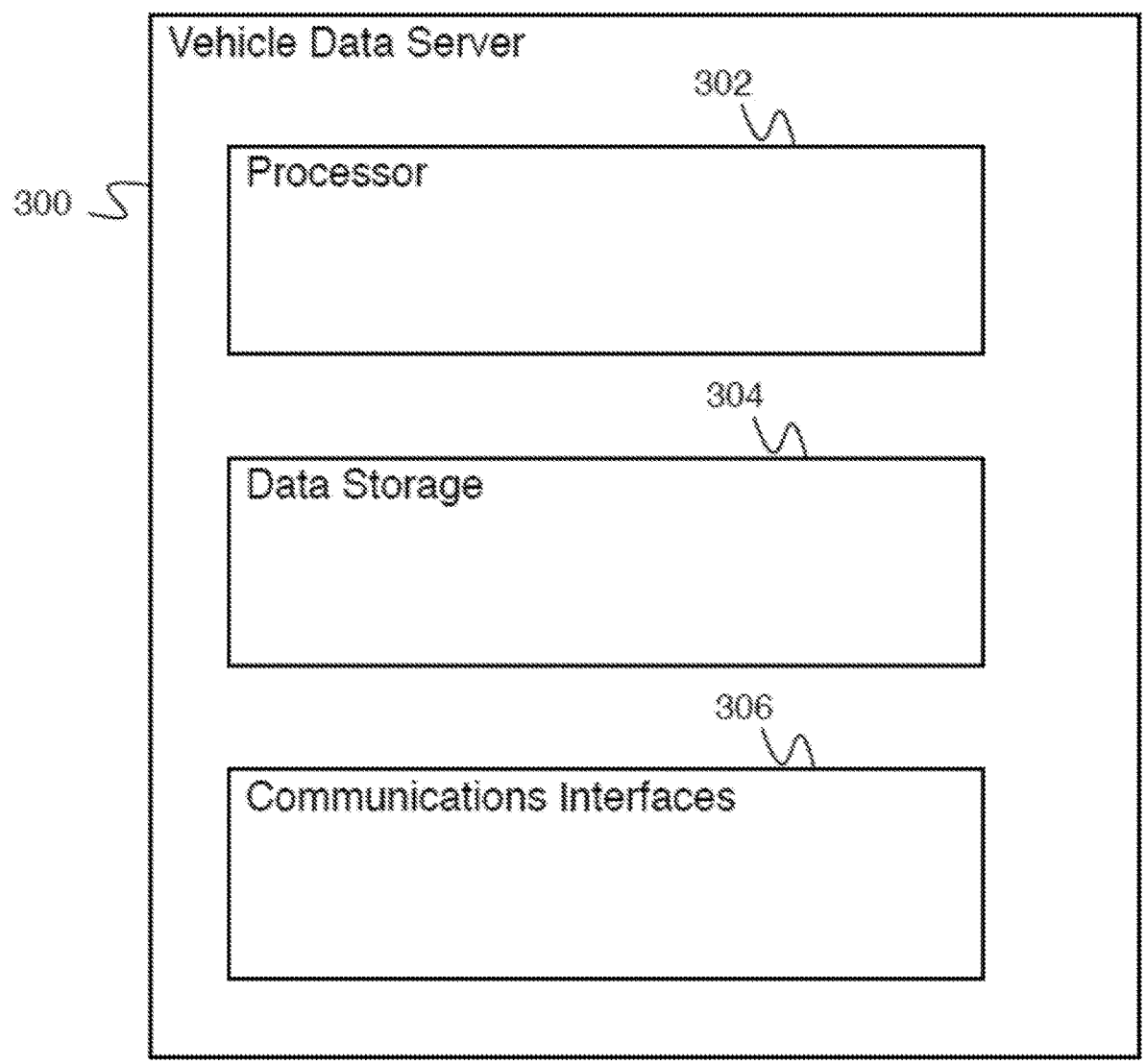
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 comprises processor 302. Data storage 304 comprises a data storage (e.g., a random access memory (RAM), a read only memory (ROM), a nonvolatile memory, a flash memory, a hard disk, or any other appropriate data storage). In various embodiments, data storage 304 comprises a data storage for storing instructions for processor 302, vehicle event recorder data, vehicle event data, sensor data, video data, map data, machine learning algorithm data, or any other appropriate data. In various embodiments, communications interfaces 306 comprises one or more of a GSM interface, a CDMA interface, a WiFi interface, an Ethernet interface, a USB interface, a Bluetooth interface, an Internet interface, a fiber optic interface, or any other appropriate interface. In various embodiments, vehicle data server 300 receives events, maneuvers, data, or any other appropriate information from one or more vehicle event recorders.

As explained above with respect to FIG. 1, there are times when vehicle event recorder 102 comprises multiple units mounted in different locations within vehicle 106 instead of a single unit, for example, to accommodate space constraints for a given location and where more space is required to house electronic components. Moreover, depending on the application, multiple vehicle event recorders or sensor recording devices can be installed in one vehicle, in multiple vehicles, or in various other locations. In some embodiments, each of these multiple vehicle event recorders or sensor recording devices comprises its own set of sensors, processors, data collection and storage systems, and provides its own time-stamped sensor data to vehicle data server 104 for further processing. In the event where multiple vehicle event recorders or multiple units are used, vehicle data server 104 comprises a system for collecting data from the multiple vehicle event recorders or multiple units. In particular, vehicle data server 104 receives data, processes data, stores data, requests more data, and provides stored data to and from multiple vehicle event recorders. In some embodiments, vehicle data server 104 comprises a system for analyzing and displaying vehicle event recorder data collected from multiple vehicle event recorders.

In some embodiments, vehicle event recorder 102 keeps a current device time on its own internal device clock and initially (e.g., after being installed and powered on) synchronizes its clock to a time standard via network time protocol (NTP). In addition, vehicle event recorder 102 also includes a battery-backed chip (e.g., a real time clock(RTC)) that keeps the current device time and that will periodically get updated. Thus, each vehicle event recorder or sensor recording device has a current device time it uses to time stamp sensor data as the data is being collected and recorded.

In such cases where vehicle event recorder 102 comprises multiple units or sensor recording devices, it becomes important to make sure that all of the devices keep the same time in order to sync the data from the various multiple devices corresponding to an anomalous event for proper analysis and display by vehicle data server 104. Accordingly, a technique is disclosed herein to time synchronize sensor data collected from multiple sensor recording devices, vehicle event recorders, or units in order to ensure an accurate depiction of anomalous events.

In some embodiments, the disclosed technique designates one of the multiple sensor recording devices, vehicle event recorders, or units as a leader device and the remaining of the multiple sensor recording devices, vehicle event recorders, or units as follower devices. In some embodiments, a leader device is designated as a master time keeper at installation time (e.g., at a time when a vehicle event recorder 102 is installed in a vehicle 106 as depicted in FIG. 1). Typically, the leader device is configured with a cell modem and a GPS, which enables the leader device to communicate with a time source and obtain a time standard. In some cases, the leader device obtains a time standard via a GPS internal to the leader device (e.g., internal sensor GPS 226 of FIG. 2). In other cases, the leader device uses its network interface (e.g., network interface 210 of FIG. 2) to communicate to an external time source such as an Internet or a world wide web-based time source. In some instances, the leader device uses a cell modem interface to communicate with a cell network that provides a time standard.

After a leader device is installed in a vehicle (e.g., vehicle 106 of FIG. 1) and powered on, it is associated with a local network such as a WiFi or Ethernet network (e.g., network 100 of FIG. 1) that it shares with each of the follower devices. Each of the leader device and the follower devices communicate through the network via a network interface (e.g., network interface 210 of FIG. 2).

In some embodiments, when powered on, the leader device obtains a current leader device time from a time source as described above and opens a network leader socket on a local network (e.g., Ethernet or WiFi) shared with the follower devices. When the follower devices power on, they attempt to connect to the leader socket at a configured IP address. If initial attempts to connect by a follower device fail, the follower device retries to connect to the leader socket with an increasing amount of time between each of its attempts to connect. Upon successful connection to the leader socket over the local network, the follower device sends the leader device a registration message thereby initiating a follower registration sequence.

Figure 4:
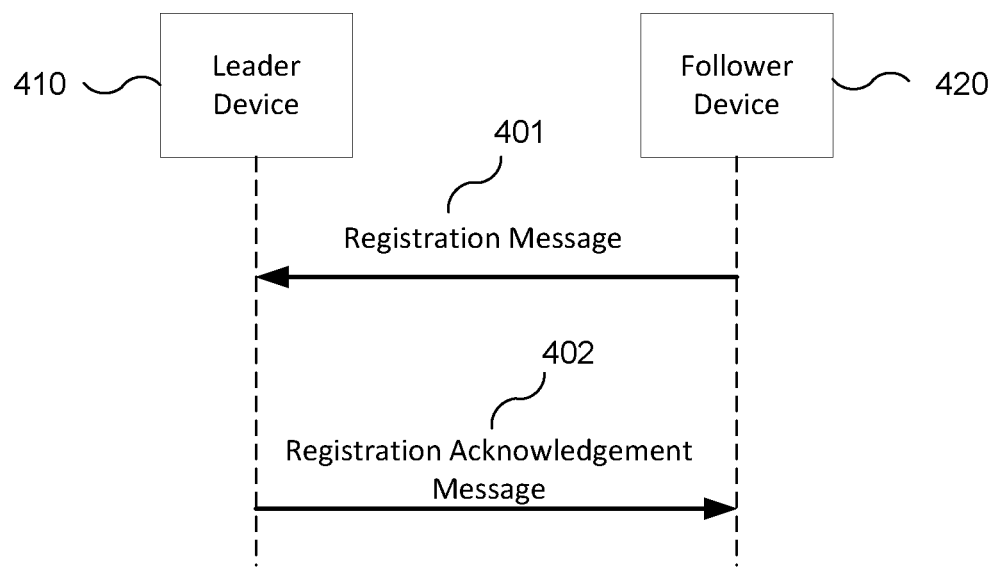
FIG. 4 is a block diagram illustrating an embodiment of a follower registration sequence.

FIG. 4 is a block diagram illustrating an embodiment of a follower registration sequence. As shown in FIG. 4, follower device 420 sends a registration message 401 to leader device 410 over a network (e.g., network 100 of FIG. 1). In response to registration message 401 received from follower device 420, leader device 410 sends a registration acknowledgement message 402. In some embodiments, registration acknowledgement message 402 includes a leader device time. Follower device 420 obtains the leader device time from registration acknowledgement message 402 received from leader device 410 and compares the leader device time to its own follower device time or current device time to determine a time difference between the leader device time and the follower device time. If the time difference is determined to be greater than a threshold value, follower device 420 jumps its own follower device time to the leader device time. For example, in some cases, the threshold value is chosen to be preferably within a range between and including 0.5 seconds and 2 seconds. Otherwise, follower device 420 relies on NTP to sync to the leader time of leader device 410.

FIGS. 5A-5C depict embodiments of message packet formats for messages exchanged (e.g., registration message 401 and registration acknowledgement message 402 as described with respect to FIG. 4) between a leader device (e.g., leader device 410 of FIG. 4) and a follower device (e.g., follower device 420 of FIG. 4) over a network (e.g., network 100 of FIG. 1). In particular, FIG. 5A depicts message header 500 for messages exchanged between a leader device and a follower device. For example, the message signature is a "magic number" that every message is required to start with. The protocol version is an integer that is increased whenever modifications are made to the message format. Device type is an integer representing the hardware type of the device sending the message. Message ID is the type of message: registration, ack, etc. FIG. 5B depicts registration message payload 501 for a registration message (e.g., registration message 401 of FIG. 4) sent by a follower device to a leader device. FIG. 5B depicts an embodiment of an acknowledgement message payload for a registration acknowledgement message (e.g., registration acknowledgement message 402 of FIG. 4) sent by a follower device to a leader device. For example, firmware major, minor, and build are all numbers used to track the firmware on the device. The device settings hash is a checksum of all the device settings appended together, which is used to verify whether settings are the same across devices. FIG. 5C depicts acknowledgement message payload 502, which includes a timestamp of acknowledged message that has 8 bytes.

Various embodiments of a process for time synchronizing sensor data recording devices as performed by a leader system will now be described with respect to FIGS. 6A-6E as follows.

Figure 6A:
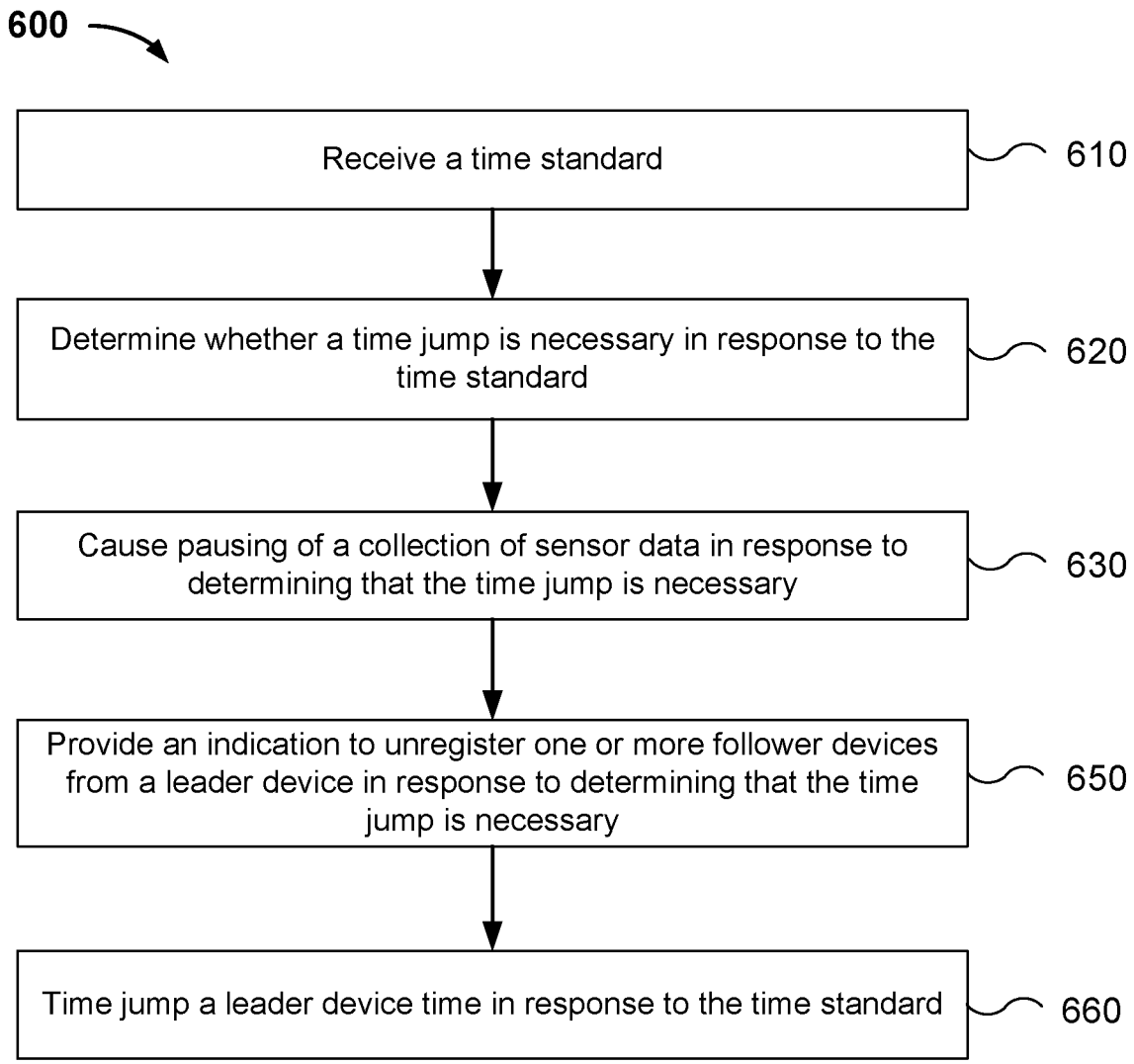
FIG. 6A is a flow diagram illustrating an embodiment of a process for time synchronizing sensor data recording devices.

FIG. 6A is a flow diagram illustrating an embodiment of a process for time synchronizing sensor data recording devices. In the example shown, the process 600 of FIG. 6A is performed by a leader system comprising a vehicle event recorder (e.g., vehicle event recorder 102 of FIG. 1), or any other appropriate device or system. In this case, the vehicle event recorder is designated as a leader device (e.g., leader device 410 of FIG. 4). The leader device is configured with a cell modem and a GPS, enabling the leader device to communicate with a time source and obtain a time standard. In the example shown, a time standard is received in 610. In some embodiments, the time standard is received via an interface of the leader system or leader device from a GPS internal to the leader device (e.g., internal sensor GPS 226 of FIG. 2). In other instances, the time standard is received via a network interface (e.g., network interface 210 of FIG. 2) from an external time source such as an Internet or a world wide web-based time source. In some cases, the interface of the leader system receives a time standard by using a cell modem interface to communicate with a cell network that provides the time standard.

Returning to FIG. 6A, in 620 the leader system determines whether a time jump is necessary in response to the time standard. In some embodiments, the leader system compares the time standard received from a time source to its own internal device time or leader device time to determine a time difference between the time standard and the leader device time. If the time difference is determined to be greater than a threshold value, the leader system jumps its leader device time to the time standard. Otherwise, the leader system relies on NTP to keep its time current with the time source. For example, in some cases, the threshold value is chosen to be preferably within a range between and including 0.5 seconds and 2 seconds. In other cases, small drifts in the leader device time can be gradually adjusted using NTP by skewing the leader device time until it is in sync with the time source. In response to determining that the time jump is necessary, the leader system causes pausing of a collection of sensor data in 630 (e.g., by providing an indication to a stop a sensor data stream from being acquired and/or stored in a buffer memory), provides an indication to unregister one or more follower devices from a leader device in 650, and time jumps a leader device time in response to the time standard in 660.

As described previously, in some cases the time standard is a GPS time standard or a cell network time standard. In some embodiments, the leader device runs NTP to keep its internal time (e.g., a current leader device time) current or in sync with a GPS or cell modem source and also runs an NTP server that includes the follower devices as clients. In some cases, the leader device synchronizes its time with an external source and because all of the followers are being run by the leader, the followers synchronize their current device times to the current leader device time.

Moreover, in some embodiments, the indication to unregister one or more follower devices from the leader device comprises closing a network leader socket to which the one or more follower devices are connected in order to communicate with the leader device.

Figure 6B:
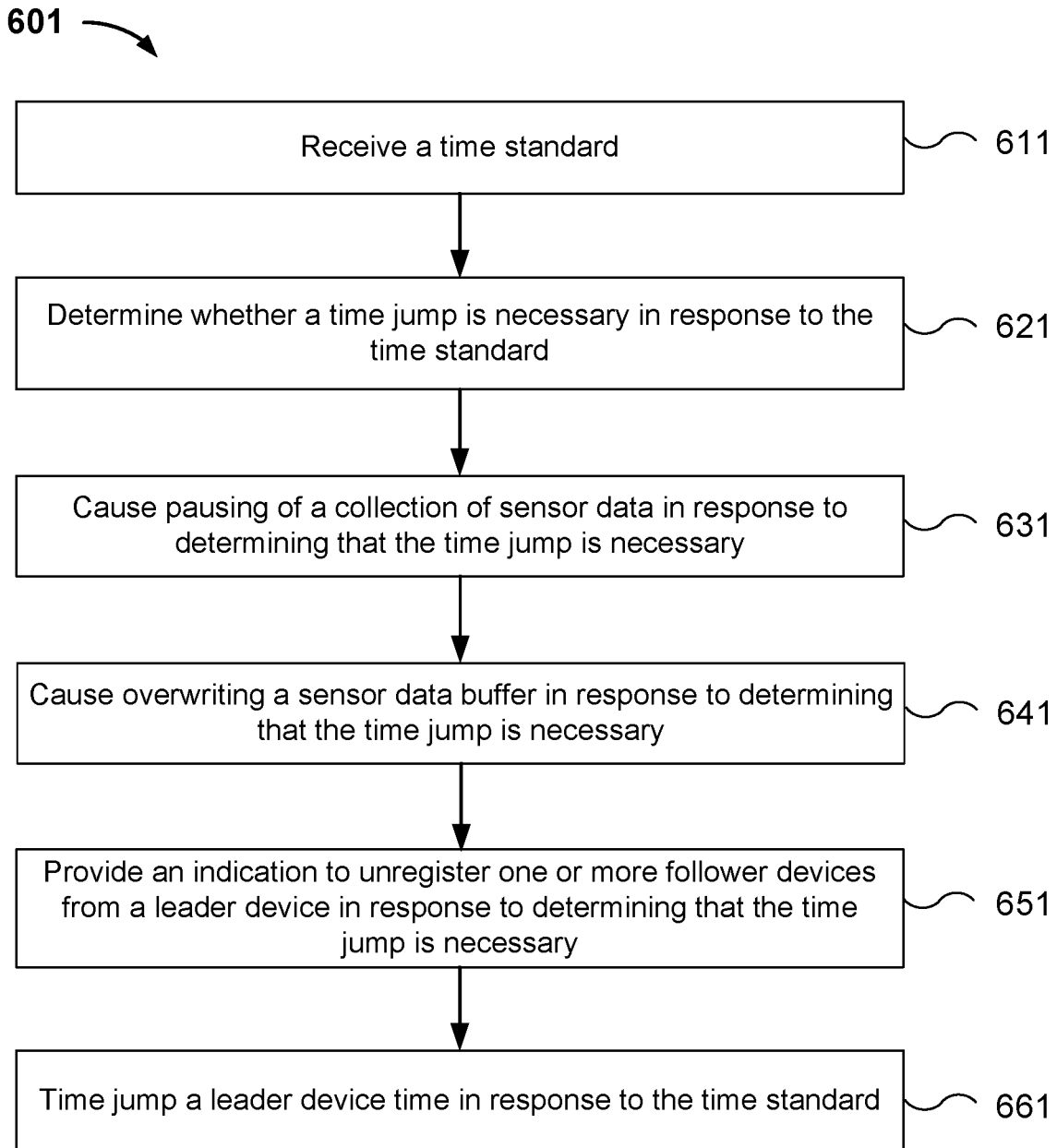
FIG. 6B is a flow diagram illustrating another embodiment of a process for time synchronizing sensor data recording devices.

FIG. 6B is a flow diagram illustrating another embodiment of a process for time synchronizing sensor data recording devices. As in the previously described process 600 of FIG. 6A, in this example process 601 of FIG. 4B is performed by a leader system comprising a vehicle event recorder (e.g., vehicle event recorder 102 of FIG. 1), or any other appropriate device or system, which in this case is designated as a leader device (e.g., leader device 410 of FIG. 4). In the example shown, a time standard is received in 611. In some embodiments, the time standard is received via an interface of the leader system or leader device. The leader system determines whether a time jump is necessary in response to the time standard in 621. In response to determining that the time jump is necessary, the leader system causes pausing of a collection of sensor data in 631 and additionally also causes overwriting a sensor data buffer in 641. The leader system provides an indication to unregister one or more follower devices from the leader device in 651 and time jumps a leader device time in response to the time standard in 661.

Figure 6C:
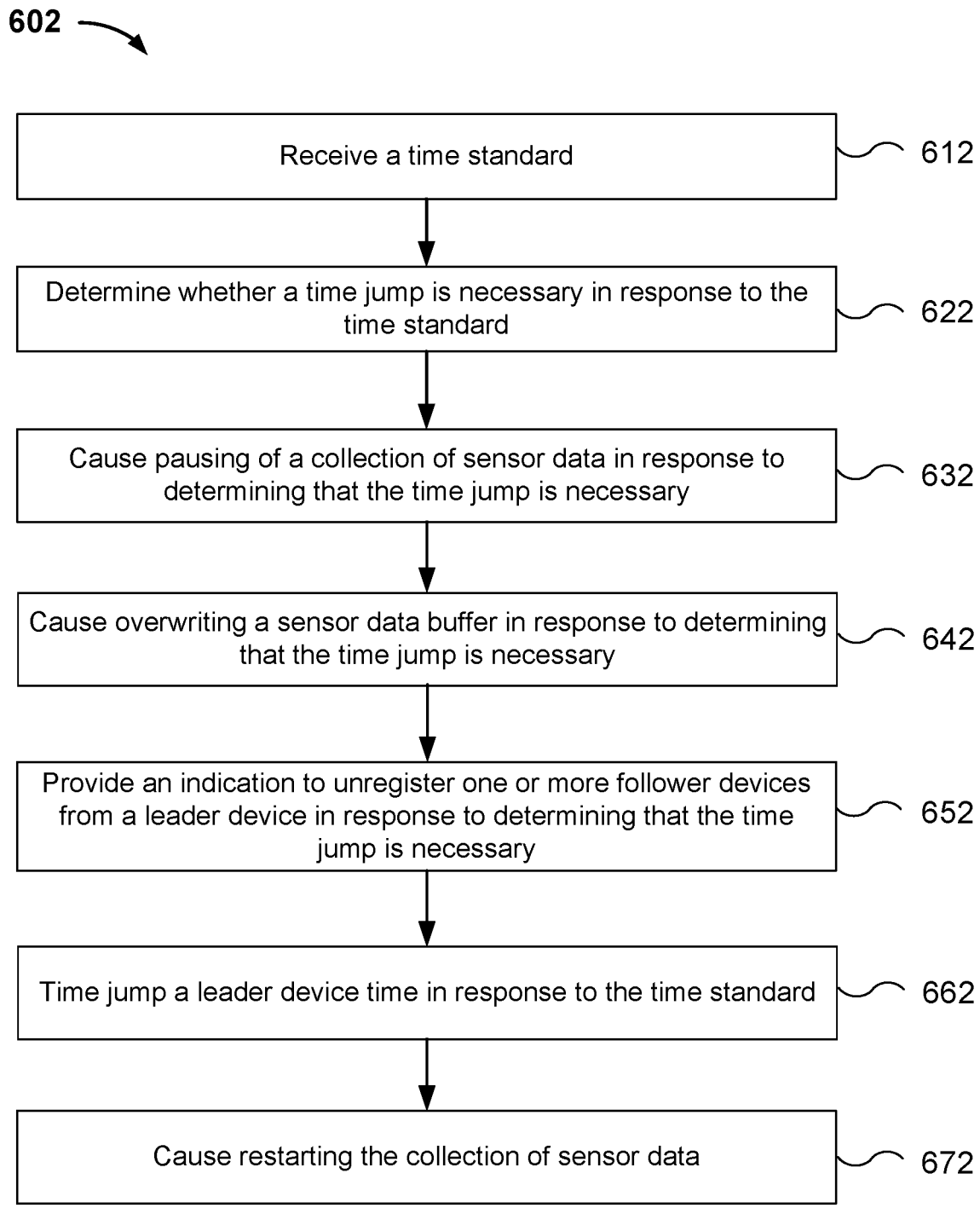
FIG. 6C is a flow diagram illustrating yet another embodiment of a process for time synchronizing sensor data recording devices.

FIG. 6C is a flow diagram illustrating yet another embodiment of a process for time synchronizing sensor data recording devices. As in the processes previously described and depicted in FIGS. 6A and 6B, in this example process 602 of FIG. 6C is performed by a leader system comprising a vehicle event recorder (e.g., vehicle event recorder 102 of FIG. 1), or any other appropriate device or system, which in this case is designated as a leader device (e.g., leader device 410 of FIG. 4). In the example shown, a time standard is received in 612. In some embodiments, the time standard is received via an interface of the leader system or leader device. The leader system determines whether a time jump is necessary in response to the time standard in 622. In response to determining that the time jump is necessary, the leader system causes pausing of a collection of sensor data in 632, causes overwriting a sensor data buffer in 642, provides an indication to unregister one or more follower devices from a leader device in 652, and time jumps a leader device time in response to the time standard in 662. Additionally, after time jumping the leader device time, the leader system causes restarting the collection of sensor data in 672.

Figure 6D:
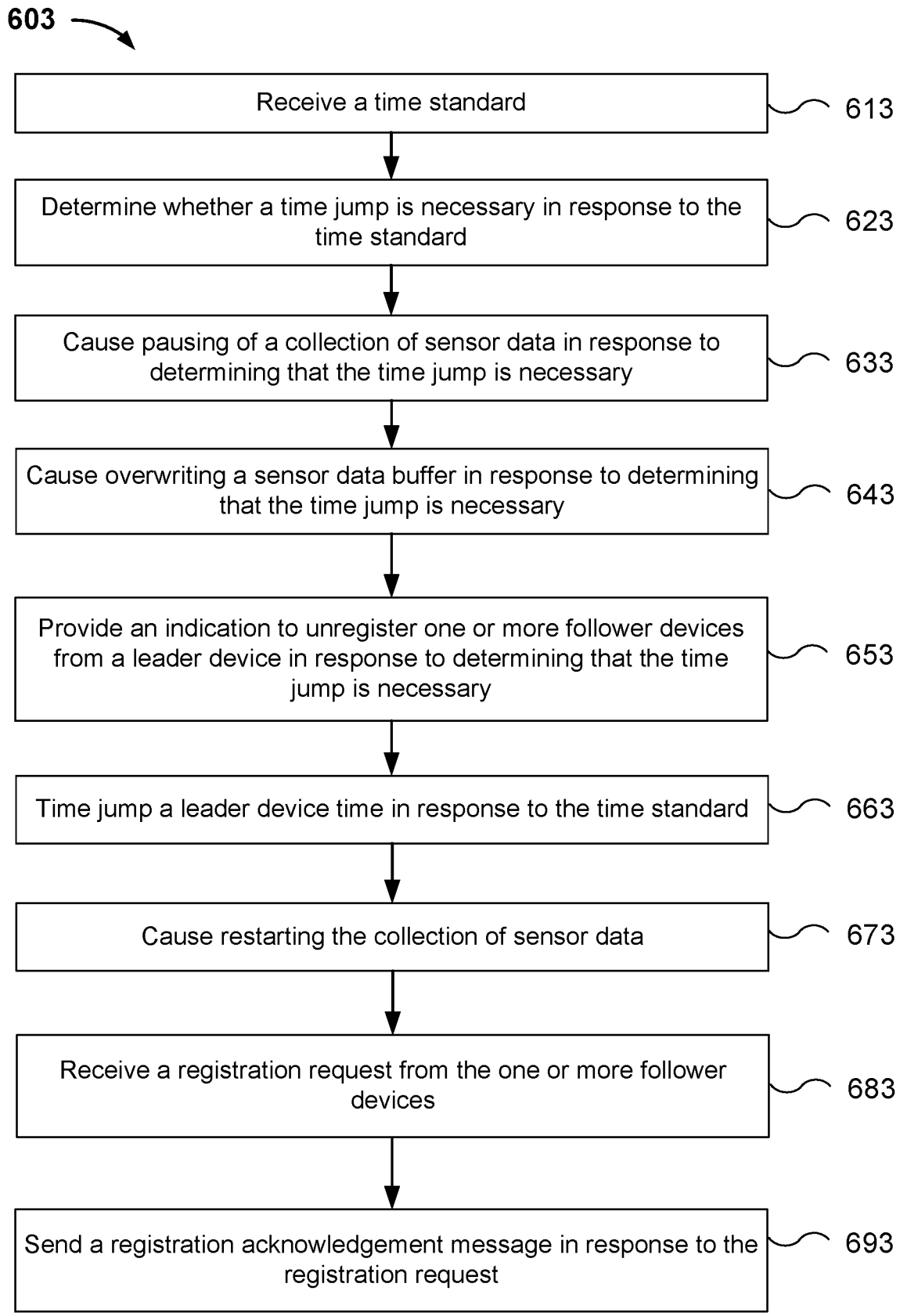
FIG. 6D is a flow diagram illustrating another embodiment of a process for time synchronizing sensor data recording devices.

FIG. 6D is a flow diagram illustrating another embodiment of a process for time synchronizing sensor data recording devices. As in the processes previously described and depicted in FIGS. 6A-6C, in this example process 603 of FIG. 6D is performed by a leader system comprising a vehicle event recorder (e.g., vehicle event recorder 102 of FIG. 1), or any other appropriate device or system, which in this case is designated as a leader device (e.g., leader device 410 of FIG. 4). In the example shown, a time standard is received in 613. In some embodiments, the time standard is received via an interface of the leader system or leader device. The leader system determines whether a time jump is necessary in response to the time standard in 623. In response to determining that the time jump is necessary, the leader system causes pausing of a collection of sensor data in 633, causes overwriting a sensor data buffer in 643, provides an indication to unregister one or more follower devices from a leader device in 653, time jumps a leader device time in response to the time standard in 663, and causes restarting the collection of sensor data in 673. Additionally, after jumping the leader device time in 663, the leader system performs an additional step in 683 of receiving a registration request (e.g., registration message 401 of FIG. 4) from the one or more follower devices. In some embodiments, in response to a registration request received from a follower device, in 693 the leader system sends a registration acknowledgement message (e.g., registration acknowledgement message 402 of FIG. 4).

Note that the additional steps in 683 and 693 of FIG. 6D are also described with respect to FIG. 4 as part of a follower registration sequence in which, upon successful connecting to the leader device via a network socket, the follower device sends the leader device a registration message or registration request in order to register with the leader device. The follower device is successfully registered with the leader device upon receiving the registration acknowledgement message sent by the leader device in response to the registration request. In some embodiments, the registration acknowledgement message sent by the leader device in response to the registration request includes a current leader device time.

In some instances, the follower registration sequence of FIG. 4 can be used to control a follower registration process with respect to a leader device. In particular, the leader system can be configured such that only a selected set of follower devices are allowed or permitted to register with a given leader device. More specifically, for a given leader device, the leader system can be configured such that only the follower devices that receive a registration acknowledgement message from the given leader device are registered with the given leader device. Thus, the leader system can be configured to register a selected set of follower devices with the leader device, for example, by specifying the selected set of follower devices allowed to be registered on a white list.

Figure 6E:
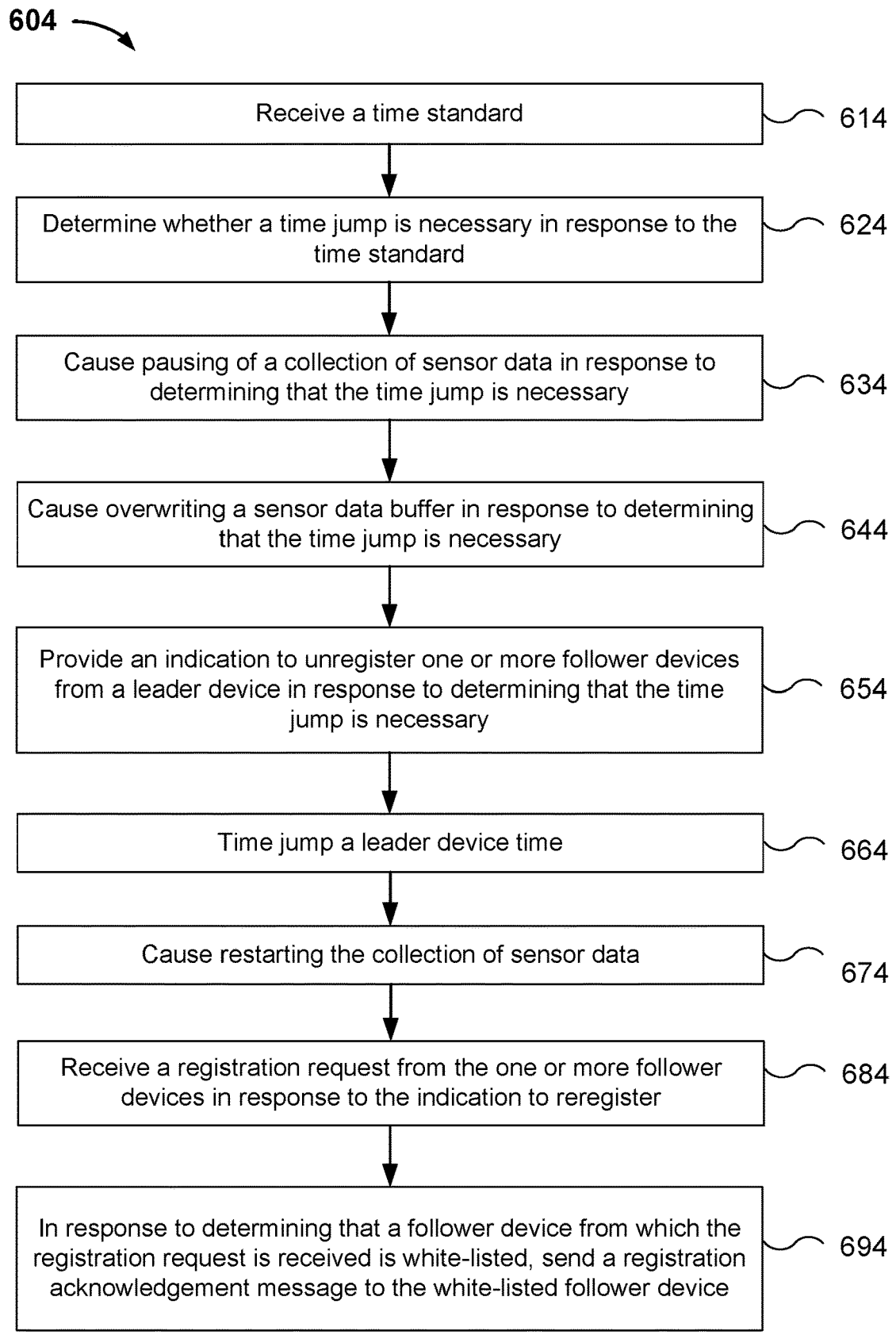
FIG. 6E is a flow diagram depicting an embodiment of a process 604 for time synchronizing sensor data recording devices that comprises the use of a white-list in a follower registration process.

FIG. 6E is a flow diagram depicting an embodiment of a process 604 for time synchronizing sensor data recording devices that comprises the use of a white-list in a follower registration process. As in the processes previously described and depicted in FIGS. 6A-6D, in this example process 604 of FIG. 6E is performed by a leader system comprising a vehicle event recorder (e.g., vehicle event recorder 102 of FIG. 1), or any other appropriate device or system, which in this case is designated as a leader device (e.g., leader device 410 of FIG. 4). In the example shown, a time standard is received in 614. In some embodiments, the time standard is received via an interface of the leader system or leader device. The leader system determines whether a time jump is necessary in response to the time standard in 624. In response to determining that the time jump is necessary, the leader system causes pausing of a collection of sensor data in 634, causes overwriting a sensor data buffer in 644, provides an indication to unregister one or more follower devices from a leader device in 654, time jumps a leader device time in response to the time standard in 664, causes restarting the collection of sensor data in 674, and receives a registration request (e.g., registration message 401 of FIG. 4) from the one or more follower devices in 684. In this case, in response to determining that a follower device from which the registration request is received is white-listed, the leader system sends a registration acknowledgement message (e.g., registration acknowledgement message 402 of FIG. 4) to the white-listed follower device in 694.

Although not depicted in FIG. 6E, in some embodiments, in response to the registration request, the leader system additionally determines whether the follower device from which the registration request is received is on a white list. In some embodiments, the white list comprises a set of follower devices for which registration is desired. For example, the white list comprises all serial numbers of follower devices allowed to register with a given leader device. In some embodiments, a follower registration process is controlled by updating the white list with an updated set of follower devices.

In some embodiments, the leader system receives or obtains new configurations from a backend of the leader system. For example, a new configuration can comprise a serial number that is no longer on the white list of follower devices for a given leader device. Additionally, in some embodiments, a change in the white list of allowed followers requires the registered followers to de-register, and then re-register according to whether they are on the current white list.

Various embodiments of a process for time synchronizing sensor data recording devices as performed by a follower system will now be described with respect to FIGS. 7A-7B and 8A-8C as follows.

Figure 7A:
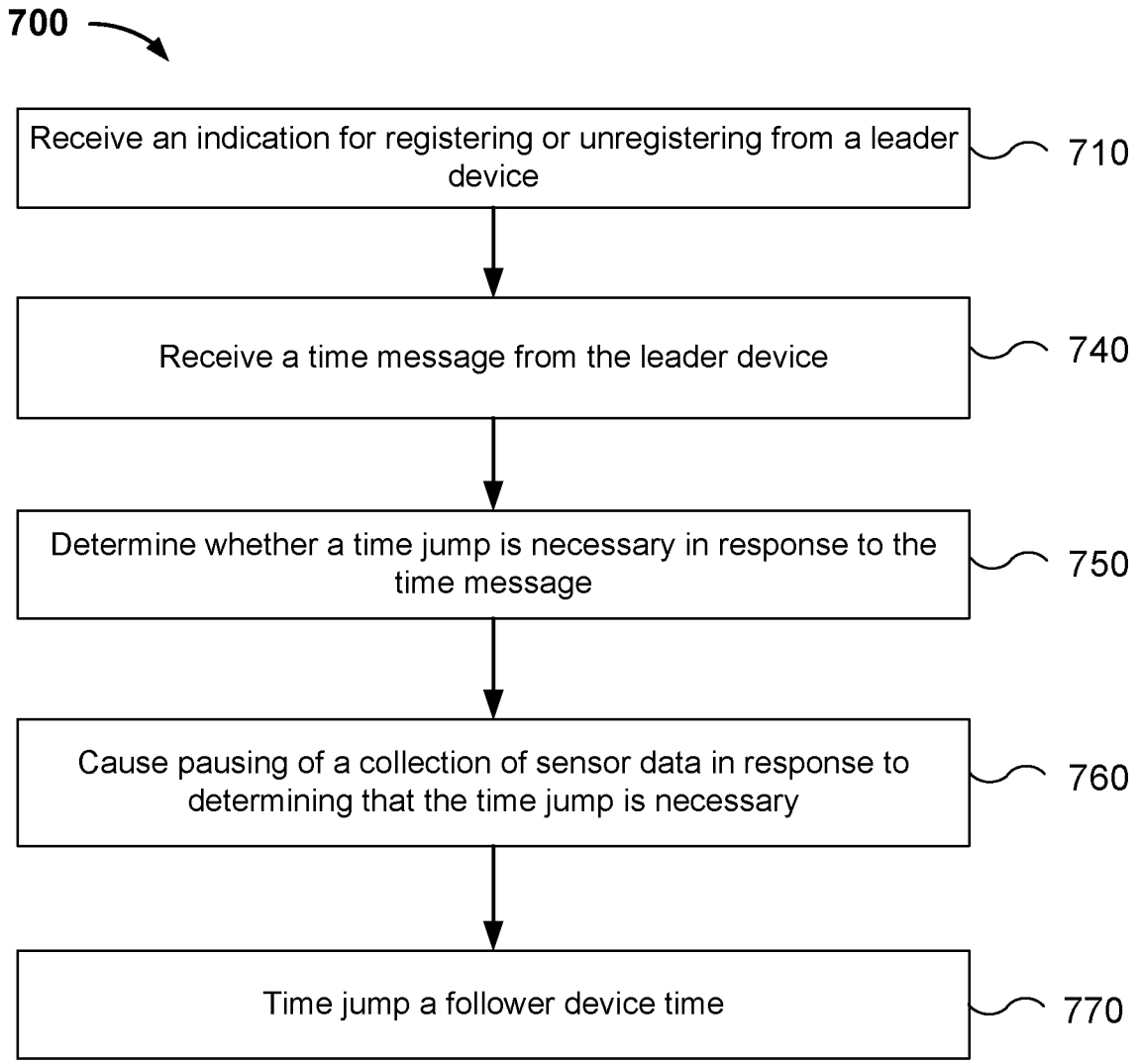
FIG. 7A is a flow diagram illustrating an embodiment of a process for time synchronizing sensor data recording devices.

FIG. 7A is a flow diagram illustrating an embodiment of a process for time synchronizing sensor data recording devices. In the example shown, the process 700 of FIG. 7A is performed by a follower system comprising a vehicle event recorder (e.g., vehicle event recorder 102 of FIG. 1), or any other appropriate device or system. In this case, the vehicle event recorder is a follower device (e.g., follower device 420 of FIG. 4). As shown in FIG. 7A, in 710 an indication is received for registering or unregistering from a leader device in 710. In some embodiments, the indication is received via an interface of a follower system or follower device. The follower system receives a time message from the leader device in 740 and determines whether a time jump is necessary in response to the time message in 750. In response to determining that the time jump is necessary, the follower system causes pausing of a collection of sensor data in 760 and time jumps a follower device time in 770.

In some embodiments, the time message received from the leader device in 740 includes a current leader device time and the follower device time is time jumped in 770 to the current leader device time.

Figure 7B:
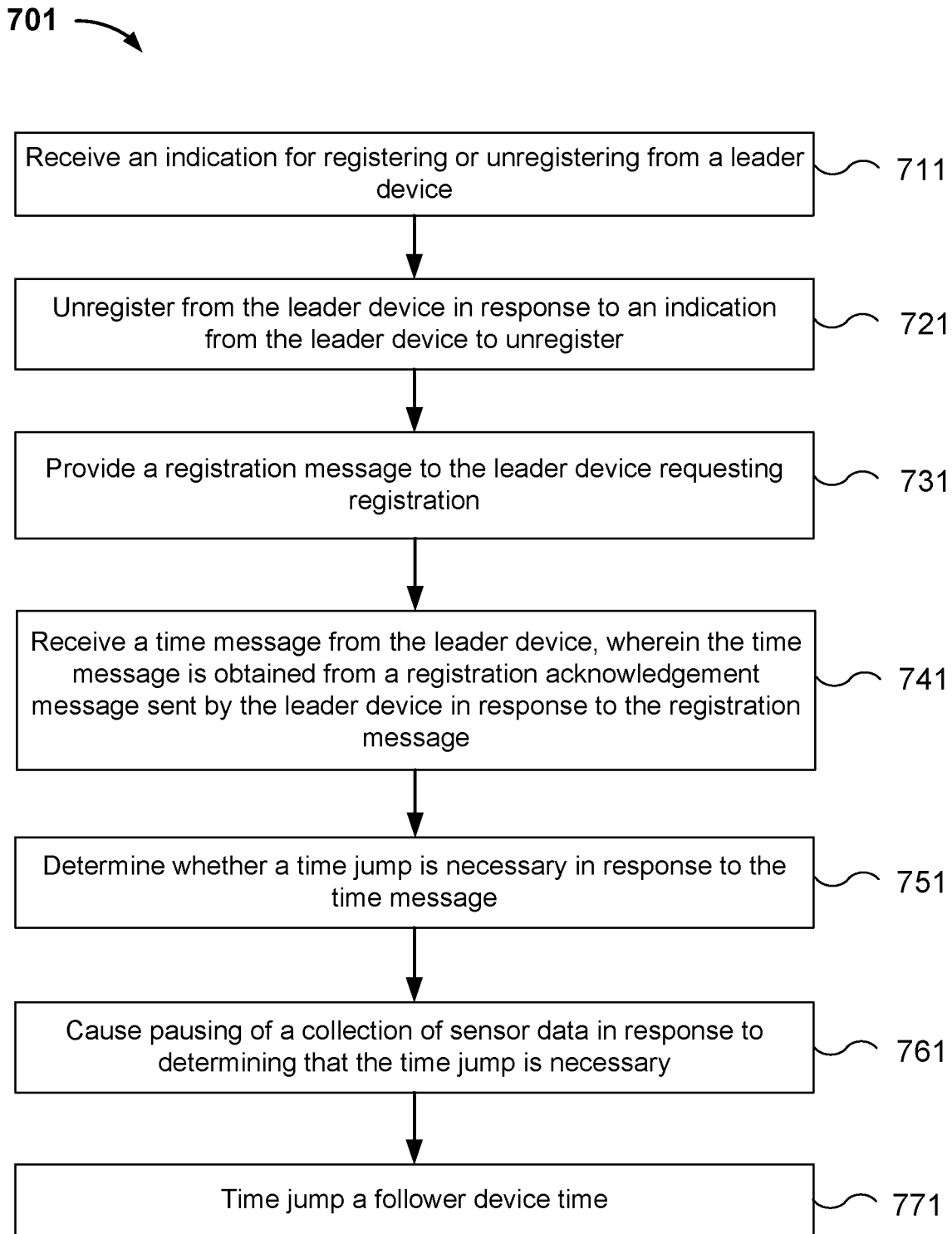
FIG. 7B is a flow diagram illustrating another embodiment of a process for time synchronizing sensor data recording devices.

FIG. 7B is a flow diagram illustrating another embodiment of a process for time synchronizing sensor data recording devices. In the example shown, the process 701 of FIG. 7B is performed by a follower system comprising a vehicle event recorder (e.g., vehicle event recorder 102 of FIG. 1), or any other appropriate device or system. In this case, the vehicle event recorder is a follower device (e.g., follower device 420 of FIG. 4). As shown in FIG. 7B, an interface of the follower system receives an indication for registering or unregistering from a leader device in 711. The follower device unregisters from the leader device in response to an indication from the leader device to unregister in 721.

In some embodiments, the indication from the leader device to unregister in 721 comprises closing a network leader socket to which the follower device is connected in order to communicate with the leader device. In these cases, unregistering from the leader device in response to an indication from the leader device to unregister includes detecting when a network socket has been closed by the leader device. After a leader device time has been updated, the leader device will re-open the leader socket. Follower systems or follower devices detect when the leader socket is closed, which indicates a de-registration process. The follower systems or follower devices will immediately begin trying with an increasing amount of time between each attempt to connect to the leader system or leader device. Once connected, the follower system or follower device will engage in an exchange of messages with the leader system or leader device as described for example with respect to FIG. 4.

Returning to FIG. 7B, in 731 the follower system provides a registration message (e.g., registration message 401 of FIG. 4) to the leader device requesting registration. In the example shown, a time message is received from the leader device in 741, the time message being obtained from a registration acknowledgement message sent by the leader device (e.g., registration acknowledgement message 402 of FIG. 4) in response to the registration message. The follower system determines whether a time jump is necessary in response to the time message in 751. In response to determining that the time jump is necessary, the follower system causes pausing of a collection of sensor data in 761 and time jumps a follower device time in 771.

Figure 8A:
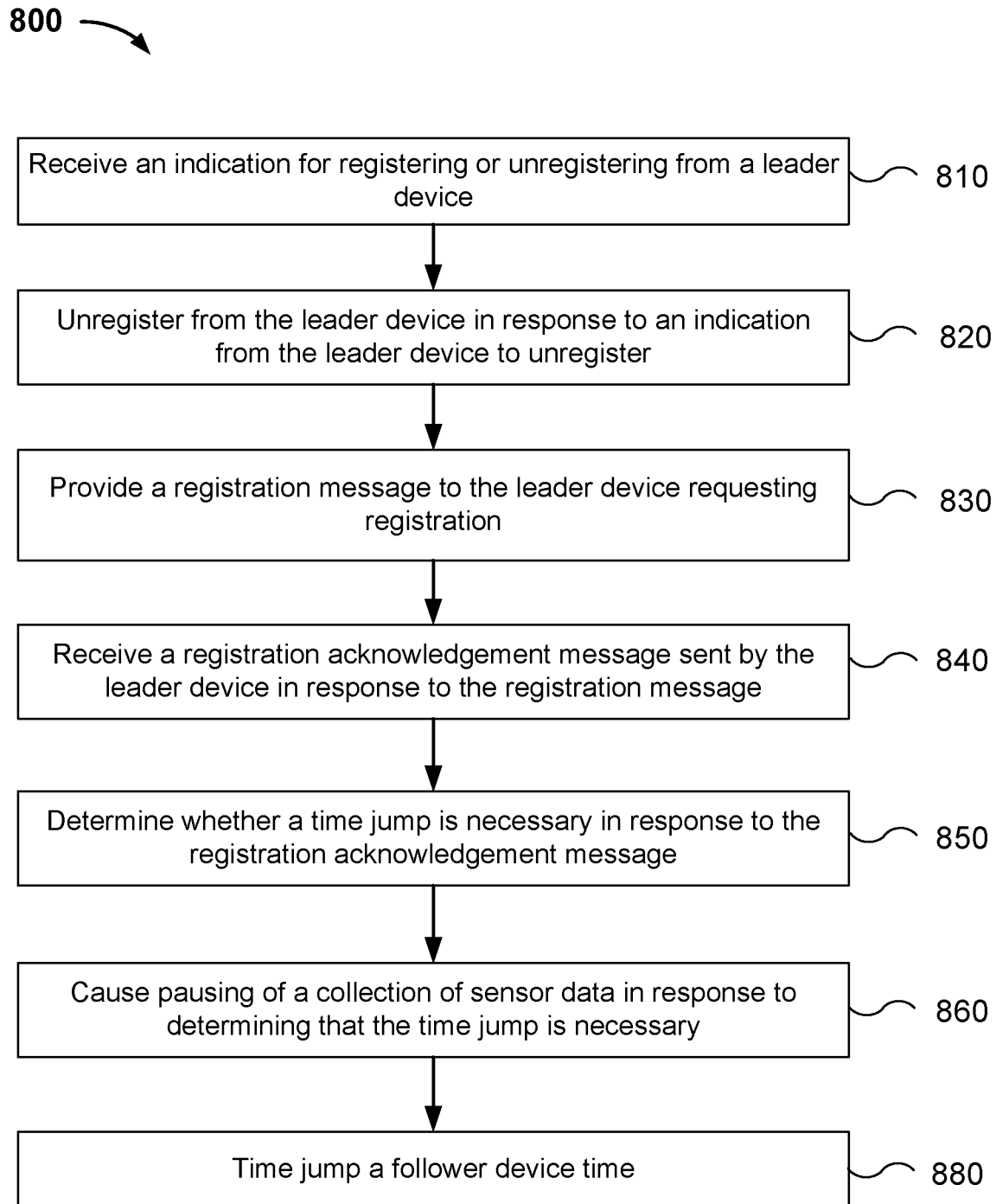
FIG. 8A is a flow diagram illustrating another embodiment of a process for time synchronizing sensor data recording devices.

FIG. 8A is a flow diagram illustrating another embodiment of a process for time synchronizing sensor data recording devices. In the example shown, the process 800 of FIG. 8A is performed by a follower system comprising a vehicle event recorder (e.g., vehicle event recorder 102 of FIG. 1), or any other appropriate device or system. In this case, the vehicle event recorder is a follower device (e.g., follower device 420 of FIG. 4). As shown in FIG. 8A, in 810 an indication is received for registering or unregistering from a leader device. In some embodiments, the indication is received via an interface of the follower system or follower device. The follower system unregisters from the leader device in response to an indication from the leader device to unregister in 820.

In some embodiments, the indication from the leader device to unregister in 820 comprises closing a network leader socket to which the follower device is connected in order to communicate with the leader device. In these cases, unregistering from the leader device in response to an indication from the leader device to unregister includes detecting when a network socket has been closed by the leader device. Follower systems or follower devices detect when the leader socket is closed, which indicates an unregistering or de-registration process.

In some embodiments, once a follower device is unregistered, it will attempt to register as long as it is configured to communicate with a leader device. Accordingly, in the event that a follower device receives an indication from a leader device to unregister, at some point the follower device will automatically send a registration message to re-register with the leader device by initiating the follower registration sequence described with respect to FIG. 4. The leader device will decide whether or not to allow the follower device to re-register based for example on a white list indicating whether the follower device is allowed to register. In parallel to this process, the leader device can also restart a collection of sensor data.

Returning to FIG. 8A, in 830 the follower system provides a registration message (e.g., registration message 401 of FIG. 4) to the leader device requesting registration. The follower system receives a registration acknowledgement message (e.g., registration acknowledgement message 402 of FIG. 4) sent by the leader device in response to the registration message in 840. The follower system determines whether a time jump is necessary in response to the registration acknowledgement message in 850. In response to determining that the time jump is necessary, the follower system causes pausing of a collection of sensor data in 860 and time jumps a follower device time in 880.

Figure 8B:
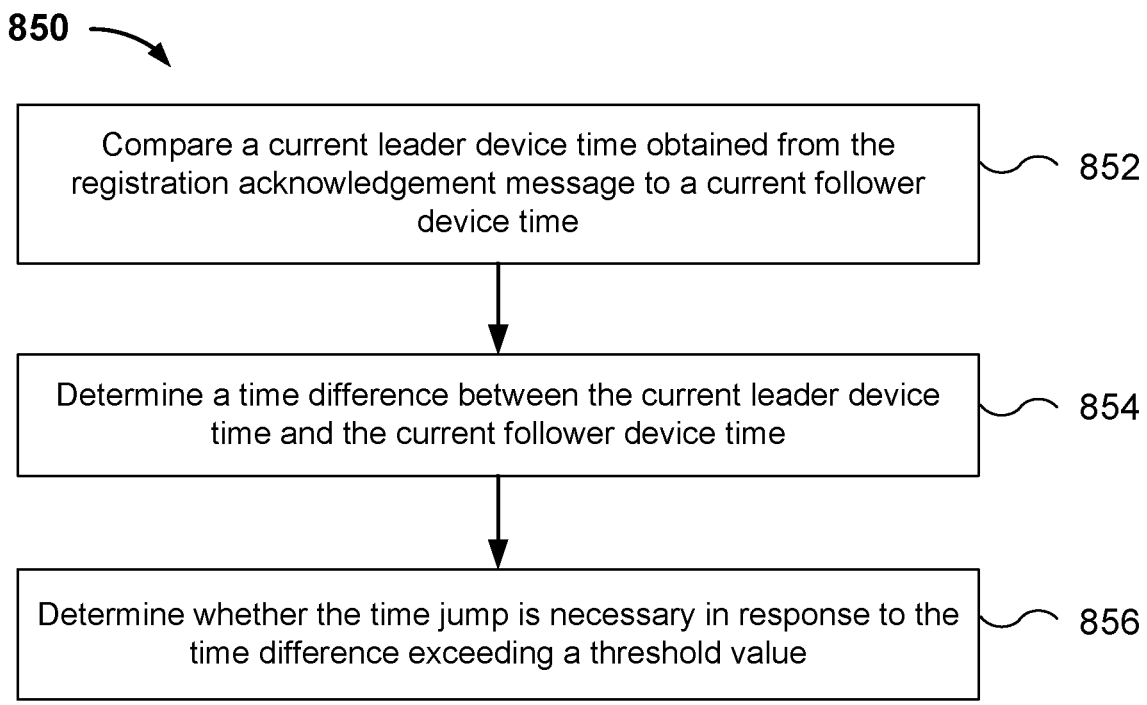
FIG. 8B is a flow diagram illustrating additional details for a process of determining whether a time jump is necessary in response to a registration acknowledgement message.

FIG. 8B is a flow diagram illustrating additional details for a process of determining whether a time jump is necessary in response to a registration acknowledgement message. In particular, in some embodiments, registration acknowledgement message (e.g., registration acknowledgement message 402 of FIG. 4) includes a leader device time. In some embodiments, determining whether a time jump is necessary in response to the registration acknowledgement message comprises comparing a current leader device time obtained from the registration acknowledgement message to a current follower device time. More specifically, in the example shown, the process in 850 of FIG. 8A further comprises: comparing a current leader device time obtained from the registration acknowledgement message to a current follower device time in 852; determining a time difference between the current leader device time and the current follower device time in 854; and determining whether the time jump is necessary in response to the time difference exceeding a threshold value in 856. If the time difference is determined to exceed or be greater than a threshold value, the follower system jumps a follower device time to the current leader device time. For example, in some cases, the threshold value is chosen to be preferably within a range between and including 0.5 seconds and 2 seconds. Otherwise, the follower system relies on NTP to sync or gradually adjust to the leader device time.

Figure 8C:
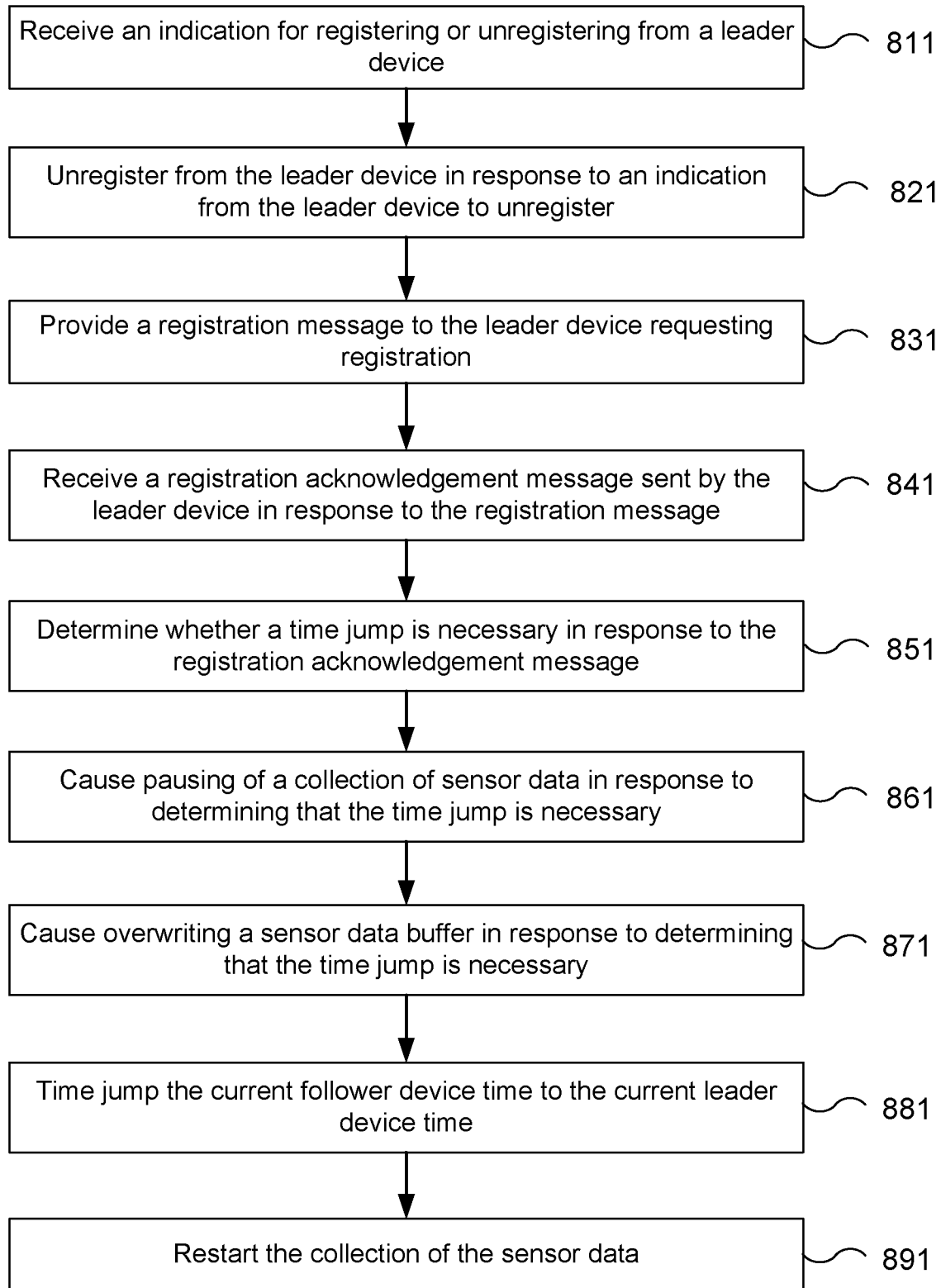
FIG. 8C is a flow diagram illustrating another embodiment of a process for time synchronizing sensor data recording devices.

FIG. 8C is a flow diagram illustrating another embodiment of a process for time synchronizing sensor data recording devices. In the example shown, the process 802 of FIG. 8C is performed by a follower system comprising a vehicle event recorder (e.g., vehicle event recorder 102 of FIG. 1), or any other appropriate device or system. In this case, the vehicle event recorder is a follower device (e.g., follower device 420 of FIG. 4). As shown in FIG. 8C, in 811 an indication is received for registering or unregistering from a leader device. In some embodiments, the indication is received via an interface of the follower system or follower device. The follower system unregisters from the leader device in response to an indication from the leader device to unregister in 821. As described above with respect to FIG. 8A, once a follower device is unregistered, it will attempt to register as long as it is configured to communicate with a leader device. Accordingly, in 831, the follower system provides a registration message (e.g., registration message 401 of FIG. 4) to the leader device requesting registration. The follower system receives a registration acknowledgement message (e.g., registration acknowledgement message 402 of FIG. 4) sent by the leader device in response to the registration message in 841. The follower system determines whether a time jump is necessary in response to the registration acknowledgement message in 851. In response to determining that the time jump is necessary, the follower system causes pausing of a collection of sensor data in 861, causes overwriting a sensor data buffer in 871, time jumps the current follower device time to the current leader device time in 881, and restarts the collection of the sensor data in 891.

In some embodiments, the sensor data is collected and stored in a sensor data buffer by a vehicle event recorder in a leader system or a follower system. In some embodiments, the sensor data buffer is a circular buffer used to store sensor data collected by the vehicle event recorder. In some embodiments, the circular buffer is a time-delay buffer (e.g., a buffer holding the last 30 seconds of data, the last 5 minutes of data, etc.). In some examples, sensor data is deleted from the time-delay buffer after the time-delay period (e.g., a buffer holding the last 30 seconds of data deletes data as soon as it is more than 30 seconds old). In some embodiments, for example where an event is determined from data in the time-delay buffer, data associated with the event is copied from the time-delay buffer into a long-term storage, non-volatile storage, or persistent memory. In some embodiments, collected sensor data is continuously being written to non-volatile storage. For example, every couple of seconds all of the most-recently collected sensor data from the circular buffers that is new (i.e., not already stored in long-term storage) is written to long term storage.

In some embodiments, when the leader system or the follower system causes pausing of a collection of sensor data (e.g., in steps 630, 631, 632, 633, 634, 760, 761, 860, and 861), sensor data ceases to be written or recorded into the circular buffer. In some embodiments, when the leader system or the follower system causes overwriting a sensor data buffer (e.g., in steps 640 and 870), sensor data in the circular buffer is cleared. In some cases, all of the sensor data in the circular buffer is recorded to long-term storage before it is cleared and before data collection resumes (e.g., when the collection of sensor data is caused to be restarted in steps 670, 671, 672, 673, 674, 890, and 891).

In some embodiments, after the leader system or the follower system causes restarting the collection of sensor data such that data collection resumes, a process is started that reads the sensor data buffer and decides what to commit to long-term storage.

In the case where data associated with an event is copied from the circular buffer into long-term storage, the access and retrieval of data can be triggered by the event of interest. For example, in the case where an event of interest has happened or has been detected, a seek function is used to search back in time in the circular buffer in order to retrieve a particular block of time associated with the trigger or event (e.g., a certain time period before and after a particular timestamp). However, the seek function requires that records are always increasing in time. Time jumps within the circular buffer create problems where data associated with a particular event needs to be retrieved from the circular buffer based on a timestamp. Thus, an advantage of the disclosed technique is that instead of relying solely on NTP for time synchronization, time jumps using the disclosed system and method are determined and controlled, which ensures that no time jumps exist in the sensor data buffer. Instead, in the event that the leader system or follower system determines to jump time, it causes pausing of sensor data collection, causes overwriting of the sensor data buffer such that the data is cleared, wherein before being cleared, the data in the sensor data buffer is recorded to long-term storage. Once the collection of data is restarted, the leader system or follower system starts writing data into the sensor data buffer, and the process of deciding whether or not to write that data in long-term storage starts. In some embodiments, for example, where the time is jumped backwards in time, data already existing in long-term storage with a particular timestamp will not be overwritten by data collected in the sensor data buffer with the same time stamp. In this case, any new data being collected in the sensor data buffer will not be used to overwrite or record over an existing data record with the same timestamp in long-term storage.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an interface configured to receive a time standard; and
a processor configured to:
  cause pausing of a collection of sensor data before a time jump;
  determine whether the time jump is necessary, comprising to:
    determine a time difference between the time standard and a leader device time; and
    in response to a determination that the time difference is equal to or greater than a threshold value, determine that the time jump is necessary; and
  in response to determining that the time jump is necessary:
    cause overwriting a sensor data buffer;
    provide an indication to unregister one or more follower devices from a leader device;
    time jump the leader device time in response to the time standard; and
    cause restarting the collection of the sensor data after the time jump.

2. The system of claim 1, wherein the indication to unregister the one or more follower devices from the leader device comprises closing a network socket to which the one or more follower devices are connected.

3. A system, comprising:
an interface configured to receive a time standard; and
a processor configured to:
  determine whether a time jump is necessary, comprising to:
    determine a time difference between the time standard and a leader device time; and
    in response to a determination that the time difference is equal to or greater than a threshold value, determine that the time jump is necessary;
  in response to determining that the time jump is necessary:
    cause overwriting a sensor data buffer;
    provide an indication to unregister one or more follower devices from a leader device; and time jump the leader device time in response to the time standard;
receive a registration request from the one or more follower devices; and
send a registration acknowledgement message in response to the registration request from the one or more follower devices, wherein the registration acknowledgement message includes a current leader device time.

4. A system, comprising:
an interface configured to receive a time standard; and
a processor configured to:
determine whether a time jump is necessary, comprising to:
determine a time difference between the time standard and a leader device time; and
in response to a determination that the time difference is equal to or greater than a threshold value, determine that the time jump is necessary;
in response to determining that the time jump is necessary:
cause overwriting a sensor data buffer;
provide an indication to unregister one or more follower devices from a leader device; and
time jump the leader device time in response to the time standard;
receive a registration request from the one or more follower devices;
determine whether a follower device of the one or more follower devices from which the registration request is received is on a white list; and
in response to determining that the follower device from which the registration request is received is on the white list, send a registration acknowledgement message to the follower device determined to be on the white list, wherein the registration acknowledgement message includes a current leader device time.

5. A method, comprising:
receiving a time standard;
causing pausing of a collection of sensor data before a time jump;
determining, using a processor, whether the time jump is necessary, comprising:
determining a time difference between the time standard and a leader device time; and
in response to a determination that the time difference is equal to or greater than a threshold value, determining that the time jump is necessary; and
in response to determining that the time jump is necessary:
causing overwriting a sensor data buffer;
providing an indication to unregister one or more follower devices from a leader device;
time jumping the leader device time in response to the time standard; and
causing restarting the collection of the sensor data after the time jump.

6. A computer program product, the computer program product being embodied in a non-transitory computer readable storage medium and comprising computer instructions for:
receiving a time standard;
causing pausing of a collection of sensor data before a time jump;
determining, using a processor, whether the time jump is necessary, comprising:
determining a time difference between the time standard and a leader device time; and
in response to a determination that the time difference is equal to or greater than a threshold value, determining that the time jump is necessary; and
in response to determining that the time jump is necessary:
causing overwriting a sensor data buffer;
providing an indication to unregister one or more follower devices from a leader device;
time jumping the leader device time in response to the time standard; and
causing restarting the collection of the sensor data after the time jump.

7. A system, comprising:
an interface configured to receive a time message from a leader device, wherein the time message is obtained from a registration acknowledgement message sent by the leader device in response to a registration message; and
a processor configured to:
determine whether a time jump is necessary, comprising to:
compare a leader device time obtained from the registration acknowledgement message to a follower device time;
determine a time difference between the leader device time and the follower device time; and
in response to a determination that the time difference is equal to or greater than a threshold value, determine that the time jump is necessary;
in response to determining that the time jump is necessary:
cause overwriting a sensor data buffer;
time jump the follower device time;
receive an unregister indication from the leader device to unregister, wherein the unregister indication comprises a detection of a network socket that has been closed by the leader device;
unregister from the leader device in response to the unregister indication; and
provide the registration message to the leader device requesting registration.

8. The system of claim 7, wherein the time message from the leader device includes a current leader device time and wherein the follower device time is time jumped to the current leader device time.

9. The system of claim 7, wherein unregistering from the leader device comprises detecting when a network socket has been closed by the leader device.

10. The system of claim 7, wherein the processor is further configured to:
provide a registration message to the leader device requesting registration.

11. The system of claim 7, wherein the processor is further configured to:
provide a registration message to the leader device requesting registration.

12. The system of claim 11, wherein the processor is further configured to:
receive a registration acknowledgement message sent by the leader device in response to the registration message.

13. The system of claim 12, wherein determining whether the time jump is necessary in response to the registration acknowledgement message comprises comparing a current leader device time obtained from the registration acknowledgement message to a current follower device time.

14. The system of claim 13, wherein comparing the current leader device time to the current follower device time comprises:
    determining a time difference between the current leader device time and the current follower device time; and
    determining whether the time jump is necessary in response to the time difference exceeding a threshold value.

15. The system of claim 7, wherein the processor is further configured to restart the collection of the sensor data.

16. A method, comprising:
    receiving a time message from a leader device, wherein the time message is obtained from a registration acknowledgement message sent by the leader device in response to the registration message; and
    determining, using a processor, whether a time jump is necessary, comprising:
        comparing a leader device time obtained from the registration acknowledgement message to a follower device time;
        determining a time difference between the leader device time and the follower device time; and
        in response to a determination that the time difference is equal to or greater than a threshold value, determining that the time jump is necessary; and
    in response to determining that the time jump is necessary:
        causing overwriting a sensor data buffer;
        time jumping the follower device time;
    receiving an unregister indication from the leader device to unregister, wherein the unregister indication comprises a detection of a network socket that has been closed by the leader device;
    unregistering from the leader device in response to the unregister indication; and
    providing the registration message to the leader device requesting registration.

17. A computer program product, the computer program product being embodied in a non-transitory computer readable storage medium and comprising computer instructions for:
    receiving a time message from a leader device, wherein the time message is obtained from a registration acknowledgement message sent by the leader device in response to the registration message; and
    determining, using a processor, whether a time jump is necessary, comprising:
        comparing a leader device time obtained from the registration acknowledgement message to a follower device time;
        determining a time difference between the leader device time and the follower device time; and
        in response to a determination that the time difference is equal to or greater than a threshold value, determining that the time jump is necessary; and
    in response to determining that the time jump is necessary:
        causing overwriting a sensor data buffer;
        time jumping the follower device time;
    receiving an unregister indication from the leader device to unregister, wherein the unregister indication comprises a detection of a network socket that has been closed by the leader device;
    unregistering from the leader device in response to the unregister indication; and
    providing the registration message to the leader device requesting registration.

* * * * *